Patented Sept. 2, 1952

2,609,345

UNITED STATES PATENT OFFICE 2,609,345

REGENERATION OF A FIXED-BED FISCHER-TROPSCH CATALYST

Joseph C. Easly and Hugh L. Kellner, Oakmont, Pa., assignors to Gulf Research & Development Company, Pittsburgh, Pa., a corporation of Delaware No Drawing. Application July 14, 1949, Serial No. 104,817

6 Claims. (Cl. 252—419)

This invention relates to a method of regenerating solid synthesis catalysts, particularly a solid synthesis catalyst disposed in a fixed bed which has been employed in the synthesis of hydrocarbons by the reaction between carbon monoxide and hydrogen.

Several methods for carrying out the reaction between carbon monoxide and hydrogen in the presence of a solid synthesis catalyst have been proposed, including methods involving the use of a fixed bed of synthesis catalyst in which temperature control is accomplished by means of indirect heat exchange elements, methods in which the synthesis gas mixture is contacted with the catalyst disposed in a fluidized bed, and methods operated on the adiabatic principle wherein the necessary temperature control is effected by controlling the composition and rate of flow of the synthesis gas mixture.

Fixed bed processes operating on the adiabatic principle are advantageous because the investment costs are relatively low. In order for such processes to be competitive, however, it is important that the catalyst be capable of effective use over long periods of time as catalyst changes represent a substantial part of the cost of operation. The usual cycle of operation of an adiabatic fixed bed process comprises, essentially, alternate on-stream periods during which hydrocarbons are produced with some lay-down of carbonaceous material on the catalyst and regeneration periods during which the carbonaceous material is burned off. The cycle may also include flushing periods and periods for reduction of the catalyst. It has been recognized that total time during which a catalyst may be employed is dependent upon the pressure drop across the catalyst bed. When this pressure drop becomes excessive, catalyst change is required. Another important factor affecting the time during which the catalyst may be employed is the maximum temperature to which the catalyst is subjected during regeneration. If this temperature is permitted to go too high, both the physical and chemical nature of the catalyst may be altered so as to make necessary change of catalyst.

The present invention is concerned with an improved method of regenerating a fixed bed of catalyst which has been employed in an adiabatic on-stream operation. Prior to making the discovery upon which the present invention is based, we had considered the problem of regenerating the catalyst as one primarily of effecting temperature control while subjecting the catalyst bed to a relatively low rate of flow of regeneration gases so as to reduce catalyst attrition. We therefore carried out regeneration by a procedure comprising introducing a mixture of an inert gas and an oxygen-containing gas such as air at as low a temperature as could be employed and yet accomplish burning off of the catalyst deposit; in this way controlling the maximum temperature of the catalyst bed at minimum heating and compression costs. We discovered when operating in this manner that while regeneration was effected, an increase in the pressure drop across the bed developed. Increase in pressure drop is indicative of physical deterioration of the catalyst, and may or may not be accompanied by loss of activity. Whether or not the activity of the catalyst is reduced, sufficient increase in pressure drop requires catalyst change because operation of the process becomes uneconomical due to excessive costs of forcing an adequate quantity of charge through the reactor at the high resistance to flow.

We were then of the opinion that an increase in this pressure drop was a necessary concomitant to regenerating a fixed bed of synthesis catalyst and that the reduction in the total time that a catalyst could be employed caused by pressure drop increases during regeneration periods was a basic characteristic of this type of process.

We have now discovered, however, that by heating a mixture of an inert gas and an oxygen-containing gas such as air to a relatively high temperature prior to contacting the gas mixture with the bed of used synthesis catalyst and controlling the composition and rate of flow of this gas mixture so that the maximum temperature difference in the catalyst bed at any time during regeneration is less than 300° F., and preferably less than 260° F., effective regeneration of the catalyst can be accomplished with no or very little increase in the pressure drop across the catalyst bed. This makes possible the use of the catalyst over longer periods of time than had formerly been possible.

Burning off of the carbonaceous deposit on the synthesis catalyst can be accomplished utilizing a mixture of an inert gas and air if the mixture is preheated to a temperature of the order of 450° to 500° F. In accordance with the invention the regeneration gas mixture is preheated to a temperature of at least 650° F., for example, between about 650° and about 850° F., and preferably between about 700° and about 800° F. The maximum temperature to which any part of the catalyst bed is raised at any time in the regeneration cycle should not be above about 1150°

F. and preferably should be between about 900° F. and about 1000° F.

To maintain these temperature conditions, the composition of the regeneration gas mixture and the rate of flow of this mixture are mutually controlled so that the desired maximum temperature is not exceeded and the temperature difference between the inlet temperature and the maximum temperature is less than 300° F. Since the time required for the regeneration is a factor affecting the economics of the process, we prefer to operate so that the temperature difference referred to is not less than 100° F. Especially valuable results are obtained by preheating the regeneration gas mixture to a temperature between about 700° and about 800° F. and controlling the composition and rate of flow of this mixture so that the maximum temperature reached at any point in the catalyst bed at any time during the regeneration does not exceed 1000° F. and preferably lies within the range of about 900° to 1000° F., and the temperature difference between the preheat temperature and the maximum temperature is between about 170° and about 260° F.

In practicing the present process in accordance with a preferred manner of proceeding, the regeneration is started by initially flowing in contact with the catalyst bed a gas consisting entirely or substantially entirely of inert constituents preheated to a temperature of about 700° to about 800° F. When the catalyst bed has been heated to about the temperature of this initial gas mixture, air is added to the gas at a rate such that the maximum temperature in the catalyst bed does not exceed 1000° F. The amount of air in the regeneration gas mixture is increased as the regeneration proceeds so as to burn off the less easily combustible portions of the carbonaceous deposit. Thus, while the regeneration gas in the early stages of regeneration will consist very largely of inert constituents, towards the end of the regeneration the regeneration gas may consist solely of air. The velocity of the regeneration gas through the bed, or, stated in another way, the total volume of regeneration gas passed through the bed per unit time, is controlled so as to maintain the temperature of the bed. This control may take the form of maintaining the velocity constant while adjusting the composition so as to obtain the desired temperature conditions, or the velocity may be varied so as to assist positively in the temperature control. For example, the velocity of regeneration gas through the bed is preferably greater during the middle portion of the regeneration period when maximum burning is being accomplished than at the beginning or end of this period. The regeneration is considered to have been completed when the temperature of the catalyst bed approaches the preheat temperature of the regeneration gas.

The present process is applicable to the regeneration of the solid synthesis catalysts as a class but we have found that especially effective results are obtained when the catalyst is an iron catalyst. A suitable type of iron catalyst is one prepared by precipitation of iron oxide and is employed in the form of pellets. This catalyst is especially effective in certain types of synthesis processes when in the reduced or partially reduced state. When a reduced or partially reduced catalyst is employed, the regeneration operation will be followed by a stage wherein the catalyst is reduced to the desired extent by contact with hydrogen.

The invention will be understood more fully by reference to the following specific example. The catalyst employed was prepared as a precipitated iron oxide which analysis indicated to be $Fe_2O_3$ with only traces of other metals. The catalyst had been formed in a compression pelleting machine into cylindrical pellets about ⅛ inch in diameter and ⅛ inch in height. 1400 cc. of this catalyst weighing about 2700 grams were charged to a reactor about 3 inches in diameter forming a fixed bed about 11 inches in height. The reactor was designed for adiabatic operation since it consisted simply of a reactor shell, a bottom foraminous catalyst support, and means for preventing heat loss from the catalyst bed to the atmosphere.

The catalyst was then dried by passing inert gas, specifically hydrogen, over it at a drying temperature; for example, a temperature of the order of 220° to 250° F. The dried catalyst was then partially reduced by passing heated hydrogen into contact with it until the amount of water formed indicated that the desired extent of reduction had been attained; in this case 10.9 percent reduced from the oxide. The catalyst was then employed in the synthesis of hydrocarbons in a process comprising charging to the reactor maintained at a pressure of about 150 pounds per square inch a reactor feed consisting of a fresh feed gas composed of hydrogen and carbon monoxide in a mol ratio of about 3.2:1 and a recycled gas obtained by subjecting the reaction products to condensation at a temperature of about 40° F. and the reactor pressure, the portion of the reaction products remaining in vapor form at this temperature constituting the recycled gas. The volume ratio of recycled gas to fresh feed was maintained at about 9:1. This catalyst was employed in three cycles consisting of a cycle I which comprised an on-stream period (time when the catalyst is contacted with synthesis gas) of 97 hours and a regeneration period in which the regeneration was carried out in accordance with the procedure described herein, a cycle II which comprised an on-stream period of 496.7 hours and a regeneration period, a cycle III which comprised an on-stream period of 307 hours and a regeneration period, and a final on-stream period of 330 hours after which the test operation was discontinued because adequate data had been obtained.

To illustrate the specific manner of carrying out the regeneration, the third regeneration period will be described more in detail. Throughout regeneration the regeneration gas introduced into the catalyst bed was preheated to a temperature of about 755° F. The regeneration was begun by introducing a gas consisting of nitrogen and a very small amount of air and the relative amount of air to nitrogen was increased throughout the regeneration period until at the end of the period the regeneration gas consisted of air. At the end of 25 hours the regeneration had been completed and the catalyst bed was ready for partial reduction. The changes made in the composition of the regeneration gas and the maximum temperature of the catalyst bed are given in the following table. It will be understood that the maximum temperature of the catalyst bed will be the temperature of the hottest zone in the bed, which is conventionally referred to as a "hot spot."

Table I

| Time, Hours | Air, cu. ft./hr. S. T. P. | Nitrogen, cu. ft./hr. S. T. P. | "Hot Spot" Temperature, °F. |
|---|---|---|---|
| 0 | 0.1 | 87.5 | 750 |
| 5 | 3.5 | 87.5 | 945 |
| 7.5 | 3.5 | 87.5 | 990 |
| 10 | 3.5 | 87.5 | 970 |
| 15 | 3.9 | 87.5 | 909 |
| 17 | 5.7 | 87.5 | 910 |
| 19 | 12.0 | 87.5 | 922 |
| 21 | 26.4 | 80.0 | 866 |
| 22 | 26.4 | 37.0 | 870 |
| 23 | 26.4 | 17.0 | 888 |
| 24 | 32.2 | 0.0 | 840 |
| 25 | 32.1 | 0.0 | 785 |

Under these conditions the pressure drop through the catalyst bed was increased so little during the regeneration period that it was barely detectable. It will be noted that the maximum temperature of the catalyst bed in this case was 990° F. and therefore the temperature difference between the inlet temperature and this maximum temperature was 235° F. In the other regeneration periods on this catalyst the results obtained were similar to those described. Thus, in the first regeneration period the inlet temperature was 765° F., the maximum catalyst bed temperature during the regeneration was 960° F., giving a temperature difference of 195° F. In the second regeneration period the inlet temperature was 760° F., the maximum catalyst bed temperature was 975° F. and the temperature difference was 215° F. In each case the pressure drop increase across the catalyst bed was barely detectable.

The data given in the following Table II show the advantages of the present process as compared with the practice involving introducing the regeneration gas at a relatively low temperature. In each case given in the table, the catalyst was a partially reduced iron oxide catalyst and the regeneration gas comprised an inert gas and air as described. Catalyst D of Table II is the catalyst of the example given above.

the regeneration in cycle III on catalyst C involved too high a temperature gradient and therefore caused an increase in pressure drop, the other regenerations were carried out under satisfactory conditions so that the life of the catalyst was extended. In the case of catalyst D, as previously indicated, the run was discontinued because sufficient information had been obtained.

By proceeding as described, effective regeneration of other synthesis catalysts can be accomplished. While, as previously stated, the process is especially satisfactory when employed for the regeneration of iron synthesis catalysts, which may be promoted or unpromoted, it also may be employed with advantage for the regeneration of other synthesis catalysts such as nickel and cobalt or their oxides.

It will be understood by those skilled in the art that any gas which is inert to the catalyst can be employed for admixture with the oxygen-containing gas to form the regeneration gas. Flue gas, for example, is suitable and the flue gas used may be that produced in the regeneration. In this case, the off gases from the regeneration are cooled to the desired inlet temperature, and then recycled to the reactor.

The term "adiabatic" as employed herein has its customary meaning when applied to fixed bed catalytic processes. Thus, the heat used in the process is either supplied in the gases charged to the reactor or created by the exothermic reaction taking place, and, aside from small and usually inconsequential heat losses through the wall of the reactor, the heat removed from the reactor is removed in the exit gases. A fixed bed reactor operated under adiabatic conditions is distinguished from a fixed bed reactor provided with heat exchange tubes or the like in that in the latter type reactor heat is both supplied and removed by the heat exchange elements.

Obviously many modifications and variations of the invention as hereinabove set forth may be made without departing from the spirit and scope thereof and therefore only such limitations should be imposed as are indicated in the appended claims.

Table II

| Catalyst | Cycle | Regeneration Gas Inlet Temp. °F. | Maximum Catalyst Bed Temp. °F. During Regeneration | Temperature Difference °F. | Pressure Drop Through Catalyst Bed (p. s. i.) | | | | Quantity of Regeneration Gas at Maximum Pressure Drop During Regeneration (cu. ft./hr. S. T. P.) |
|---|---|---|---|---|---|---|---|---|---|
| | | | | | Prior to Regeneration | Maximum During Regeneration | On-stream after Regeneration | Net Increase | |
| A | I | 510 | 1,050 | 540 | 0.15 | 0.40 | 0.30 | 0.15 | 68.4 |
| | II | 470 | 1,040 | 570 | 1.00 | 10+ | (1) | | 45.9 |
| B | I | 450 | 1,065 | 615 | 0.0 | 0.20 | 0.10 | 0.10 | 73.4 |
| | II | 460 | 1,020 | 560 | 0.15 | 1.80 | 1.20 | 1.05 | 78.4 |
| | III [2] | | (3) | | 1.60 | | | | |
| C | I | 720 | 980 | 260 | 0.0+ | 0.05 | 0.0+ | 0.0 | 101.7 |
| | II | 830 | 1,000 | 170 | 0.0+ | 0.1− | 0.05 | 0.0+ | 99.2 |
| | III | 755 | 1,140 | 385 | 0.10 | 0.30 | 0.20 | 0.1 | 146.8 |
| | IV | 750 | 1,000 | 250 | 0.20 | 0.45 | (1) | | 71.7 |
| D | I | 765 | 960 | 195 | 0.00 | 0.15 | 0.0+ | 0.0+ | 86.7 |
| | II | 760 | 975 | 215 | 0.0+ | 0.05 | 0.05 | 0.0+ | 80.9 |
| | III | 755 | 990 | 235 | 0.1− | 0.30 | 0.10 | 0.0+ | 87.6 |

[1] No on-stream period after regeneration.
[2] No regeneration because of high pressure drop prior to regeneration.
[3] No regeneration.

The results given in the foregoing table are indicative of those obtainable by practice of the present process. The total on-stream time for the catalysts was catalyst A, 765 hours; catalyst B, 889 hours; catalyst C, 1362 hours; and catalyst D, 1230 hours. The methods of regeneration employed in the cases of catalysts A and B are shown by the data to have limited the time during which these catalysts could be used. While

We claim:

1. The process of regenerating a fixed bed of solid synthesis catalyst which is contaminated with carbonaceous deposits from use in the synthesis of hydrocarbons by the reaction between carbon monoxide and hydrogen, under conditions such that heat evolved in the regeneration is removed from the catalyst bed substantially only with the exit gases, which comprises continuously introducing into the bed of contaminated catalyst a mixture of an inert gas and an oxygen-containing gas at an inlet temperature of about 650° to about 850° F., flowing said mixture through said catalyst bed whereby the carbonaceous deposit on said catalyst is burned off, and limiting the maximum temperature attained in the catalyst bed by controlling the ratio of inert gas to oxygen and the rate of flow of said gaseous mixture to maintain a temperature difference between said inlet temperature and the maximum temperature of the catalyst bed of less than about 300° F.

2. A process in accordance with claim 1 in which the maximum temperature during regeneration is between about 900° and about 1000° F.

3. A process in accordance with claim 1 in which the synthesis catalyst is an iron synthesis catalyst.

4. A process of regenerating a fixed bed of iron synthesis catalyst which is contaminated with carbonaceous deposits from use in the synthesis of hydrocarbons by the reaction between carbon monoxide and hydrogen, under conditions such that heat evolved in the regeneration is removed from the catalyst bed substantially only with the exit gases, which comprises continuously introducing into the bed of contaminated catalyst a mixture of an inert gas and air at a temperature of about 650° to about 850° F., flowing said mixture through said catalyst bed whereby the carbonaceous deposit on said catalyst is burned off, and limiting the maximum temperature attained in the catalyst bed by controlling the ratio of inert gas to air and the rate of flow of said gaseous mixture to maintain a temperature difference between said inlet temperature and the maximum temperature of the catalyst bed of less than about 260° F.

5. A process in accordance with claim 4 in which the composition and rate of flow of the mixture of inert gas and air are controlled to produce a maximum temperature in the catalyst bed during regeneration of between about 900° and about 1000° F.

6. A process of regenerating a fixed bed of iron synthesis catalyst which is contaminated with carbonaceous deposits from use in the synthesis of hydrocarbons by the reaction between carbon monoxide and hydrogen, under conditions such that heat evolved in the regeneration is removed from the catalyst bed substantially only with the exit gases, which comprises continuously introducing into the bed of contaminated catalyst a mixture of an inert gas and air at an inlet temperature within the range of about 700° to about 800° F., flowing said mixture through said catalyst bed whereby the carbonaceous deposit on said catalyst is burned off, and limiting the maximum temperature attained in the catalyst bed to between about 900° and 1000° F. by controlling the ratio of inert gas to air and the rate of flow of said gaseous mixture to maintain a temperature difference between said inlet temperature and the maximum temperature of the catalyst bed of between about 100° and about 260° F.

JOSEPH C. EASLY.
HUGH L. KELLNER.

REFERENCES CITED

The following references are of record in the file of this patent:

UNITED STATES PATENTS

| Number | Name | Date |
|---|---|---|
| 1,904,218 | Franceway | Apr. 18, 1933 |
| 1,999,388 | Bader et al. | Apr. 30, 1935 |
| 2,251,554 | Sabel et al. | Aug. 5, 1941 |
| 2,273,864 | Houdry | Feb. 24, 1942 |
| 2,438,584 | Stewart | Mar. 30, 1948 |
| 2,462,861 | Gunness | Mar. 1, 1949 |